June 6, 1967  A. H. MARK ETAL  3,323,444

HAY WAFERING METHOD AND APPARATUS

Filed June 12, 1963  2 Sheets-Sheet 1

INVENTORS
Alexander H. Mark,
& Kay V. Cask
BY
Barnard, McGlynn & Leising
ATTORNEYS

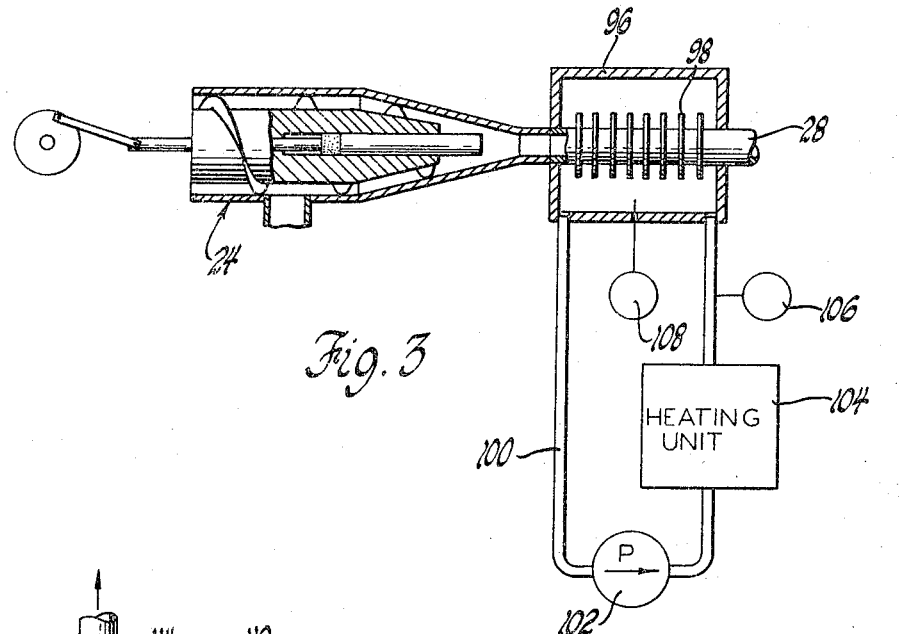
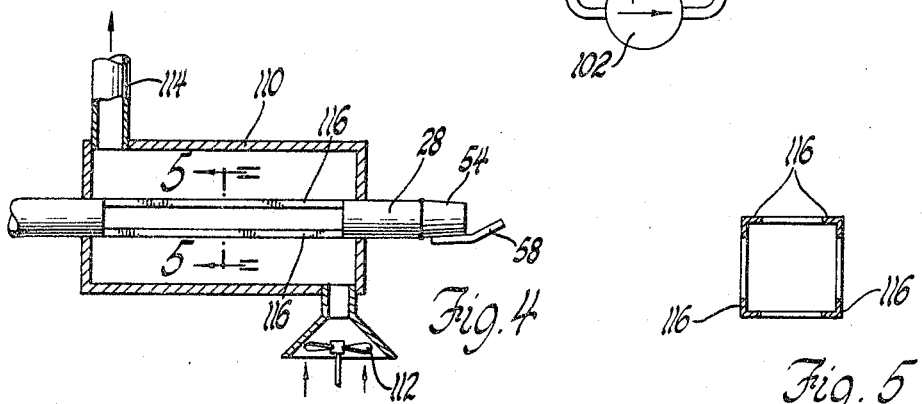
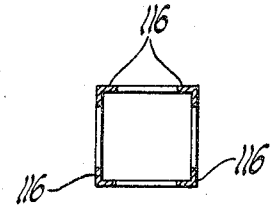
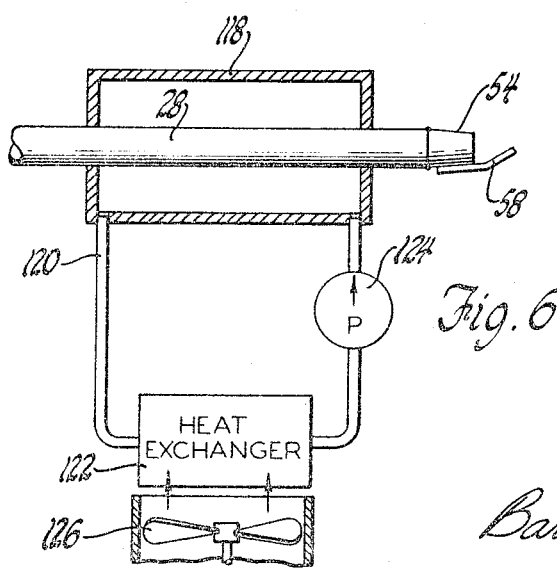

United States Patent Office 3,323,444
Patented June 6, 1967

3,323,444
HAY WAFERING METHOD AND APPARATUS
Alexander H. Mark, Livonia, and Kay V. Lask, Detroit, Mich., assignors to Massey-Ferguson Incorporated, Detroit, Mich., a corporation of Maryland
Filed June 12, 1963, Ser. No. 287,347
17 Claims. (Cl. 100—38)

This invention relates to a method and apparatus for producing hay wafers and, in particular, to a method and apparatus for field wafering forage crops into stable self-sustaining compressed hay wafers particularly characterized by minimizing the power or energy required to form such wafers, and the capability of forming such wafers from a starting crop material having a relatively wider range of moisture content than heretofore possible, while resulting in wafers which are sufficiently dry to permit relatively prompt storage thereof without danger of spoilage, having a minimum of fines and a density compatible with the handling to which they are subjected as well as permitting easy animal consumption and digestion, and otherwise being highly nutritional and palatable to livestock.

In recent times, methods and apparatus have been devised for field wafering forage crops into hay wafers comprising means for supplying hay, preferably preconditioned or processed, finely chopped, mixed and blended hay from a windrow in a field, to a wafering chamber which communicates with the entrance end of a plurality of radial die cells each having an entrance end communicating with suitable hay compression means for compressing hay received within the wafering chamber into and through the die cells to form a compressed extrusion of hay emerging from the exit ends thereof which may be broken into wafers of a desired length. As a result, as such an apparatus moves through a field of mown hay, continuous extrusions of compressed hay emerge from the exit ends of the respective die cells, and each extrusion is adapted to be engaged with an ejection means adjacent the exit ends of the die cells to break the respective extrusions of hay into hay wafers, which then preferably fall upon conveyor means for removal from the apparatus.

In one prior method and apparatus of the general type aforementioned, in order to form wafers having acceptable characteristics, it has been found to be necessary to supply an initial starting crop of hay to the wafering apparatus having a moisture content by weight within the range of approximately 12 to 15 percent. While a crop having a moisture content within such range may be available for wafering at one time or another in certain geographical areas, it will be readily apparent that consideration of such moisture content range necessarily dictates the time at which a given crop may be successfully wafered without, of course, pre-drying or adding moisture to it so as to fall within the required moisture range. On the other hand, some geographical areas have characteristic temperature, humidity and other similar conditions which normally maintain the crop to be wafered at an equilibrium moisture content either below or above the aforementioned range, thereby necessitating pre-drying or moisturizing the crop to be wafered as the geographical area dictates before actually starting the wafering process.

Furthermore, even when an apparatus of the type aforementioned is working with a starting crop within the aforementioned moisture content range, it has been conventional practice to add water or otherwise to wet the crop just prior to feeding it into the aforementioned die cells to begin the wafering action. Adding water in this way will, of course, moisten or wet the individual stem and leaf components of the crop, resulting in the fact that a certain degree of moisture will permeate each individual wafer ultimately formed. What may be said to be a critical drying time results for these wafers; that is, even if acceptable wafers are formed from the standpoint of their stability and other characteristics desired, if too much moisture is contained in the individual wafers, storage of a great bulk thereof within a silo or the like quite often results in spoilage of the wafers as will be readily apparent to those acquainted with this art. As a result, care is taken when using such prior apparatus and methods to insure that the completely formed wafers are permitted to dry for a sufficiently long time, which can be excessive from a practical standpoint, before storing the wafers to avoid such spoilage.

Methods and apparatus have also been suggested for wafering forage crops in which the crop is initially preheated to dehydrate the crop to a particular moisture range before it is ever initially introduced to the die cells in which the wafering operation occurs. The heat applied during this dehydration step naturally heats the entire mass or all of the components of the crop to be wafered, which heat is held to a considerable extent within the entire body of the wafer formed therefrom, and an effort is then made to cool the formed wafers to give them the required stability for subsequent handling and storage by blowing air completely through the bodies of the wafers. Obviously, considerable time is thus required to cool the entire body of each wafer to a point where they will retain their stability during subsequent handling. While such a process may permit using crops having a moisture content within a range which is more extensive than the range aforementioned due to the initial dehydration step aforementioned, wafering hay by pre-drying or dehydration of the crop before compression thereof in the die cells involves several additional disadvantages including, by way of example, the fact that additional energy is required to initially heat and then cool the entire mass of the crop, the required cooling time to provide a stable wafer is also increased necessitating a larger wafering apparatus to hold the wafers during their formation if reduced capacity of the apparatus is to be avoided, and wafers formed by such process have been found to be of a displeasing brown color and it appears that perhaps their nutritional value may be decreased.

In view of the foregoing considerations, the present invention contemplates a method and apparatus for wafering hay comprising means for heating the surface of a bundle of hay to be wafered to or above a predetermined heating temperature to at least partially plasticize such bundle while simultaneously applying pressure thereto to form the bundle of hay into a desired wafer shape, and maintaining such bundle of hay in such desired shape under pressure while cooling the surface thereof to a predetermined cooling temperature below the aforementioned heating temperature to set the shape of the bundle of hay so as to have a relatively dense thin bonded outer skin enclosing and confining a relatively less dense thicker body portion thereof.

More specifically in this regard, the apparatus and method of this invention is particularly characterized by means and methods of feeding hay to the entrance end of one or more axially open elongated die cells, successively applying force to the hay to compress the latter into and through the die cells to form extrusions of compressed hay emerging from the exit ends thereof, heating the surface of each extrusion of hay above a predetermined minimum heating temperature while pressure is being applied thereto to plasticize the hay and compress the latter within one portion of the length of each die cell, subsequently cooling the surface of each extrusion of hay while the latter is confined in another portion of each die cell to a predetermined cooling temperature below the aforementioned heating temperature to set the shape of the extrusion, and so as to have a relatively dense thin bonded outer skin enclosing and confining a relatively less dense thicker body portion thereof, and then breaking the set extrusions of hay emerging from the die cells into individual wafers of selected length.

The invention is further particularly characterized by the fact that it may be utilized to form wafers having the required stability and other desirable characteristics of an acceptable wafer from starting crops having a moisture content by weight in a relatively large range which entirely encompasses the moisture content range found in waferable crops in most if not all geographical areas, thereby permitting wafering of crops under a wide range of weather conditions from region to region and without waiting for a given crop to dry to a relatively limited moisture range as has been occasioned by prior art apparatus and methods as aforementioned, and further without any requirement for wetting or dehydrating the crop before beginning the wafering operation.

In addition, the invention is further characterized by the fact that the aforementioned heating and subsequent cooling of the extrusion of hay being wafered involves heating and cooling of the surface of such extrusion; that is, no effort is made to heat or cool the entire mass of the material being wafered and, in fact, a deliberate effort is made to heat and cool only the surface of such mass thereby minimizing the amount of energy required for such heating and cooling. As a consequence, the invention is further particularly characterized by the fact that the time required to provide a sufficiently cool and dry wafer for immediate, relatively speaking, storage without any danger of spoilage is drastically reduced over prior art methods and apparatus as discussed above.

Further operating economies result from the method and apparatus of this invention in that the aforementioned relatively dense thin skin formed about each wafered mass or extrusion within each die cell appears to reduce the coefficient of friction of the material being wafered, thereby minimizing the horsepower requirements imposed on the apparatus to compress the extrusions through the die cells.

In order to facilitate an understanding of the invention, several preferred embodiments thereof will now be described with reference to the accompanying drawings in which:

FIGURE 3 is a view corresponding generally to FIGURE 2, but illustrating another preferred embodiment of a heating means which may be employed with the apparatus illustrated in FIGURES 1 and 2;

FIGURE 4 is a view corresponding generally to FIGURE 2, but illustrating another preferred embodiment of a cooling means which may be employed with the apparatus illustrated in FIGURES 1 and 2;

FIGURE 5 is an enlarged sectional view taken on line 5—5 of FIGURE 4; and

FIGURE 6 is a view corresponding generally to FIGURE 4, but illustrating another preferred embodiment of a cooling means which may be employed with the apparatus of FIGURES 1 and 2.

Figure 1:
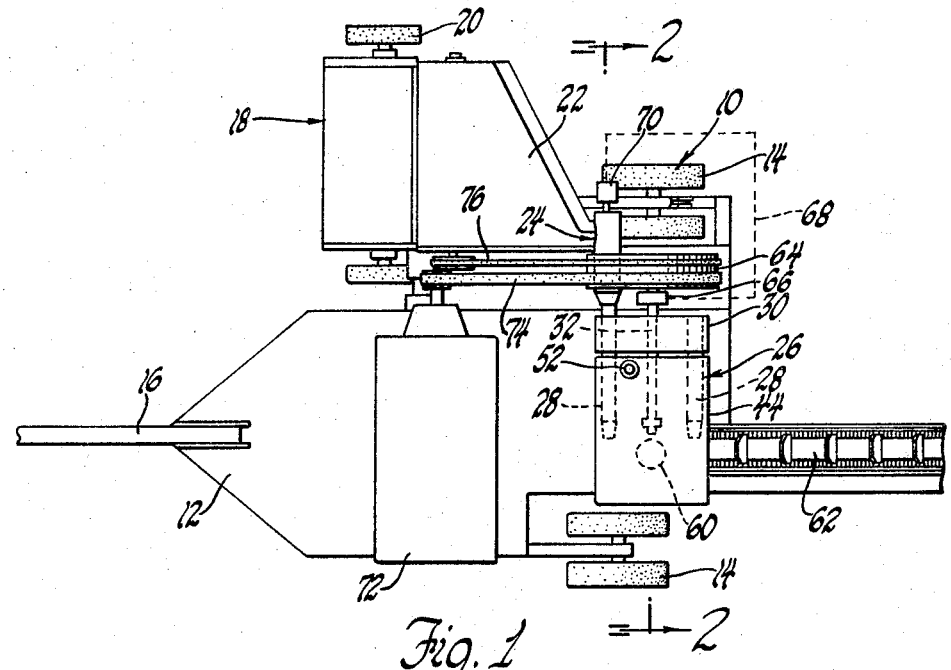
FIGURE 1 is a top plan view, partially schematic in nature, of a hay wafering apparatus illustrating a preferred embodiment of the method and apparatus of this invention.

Referring now to the drawings, the numeral 10 in FIGURE 1 generally indicates a hay wafering apparatus comprising a mobile frame 12 equipped with ground-engaging wheel means 14 in the usual manner, and a drawbar 16 adapted to be hitched to a suitable prime mover, such as an agricultural tractor, for drawing the frame along a field of mown hay. The numeral 18 generally indicates a pick-up mechanism equipped with ground-engaging wheel means 20 in the usual manner and suitably coupled in a conventional way to the frame of the apparatus so as to be towed by the latter, the pick-up mechanism preferably being of the known rotary flail type or the like and being operable to direct homogenized hay from a windrow in the field into the delivery chute 22 of the pick-up mechanism which delivers the hay through a suitable opening in the side wall of a horizontally disposed feed hopper and compression mechanism indicated generally at 24 and suitably mounted on the frame 12.

A die cell construction is indicated generally at 26, and comprises an annular series of axially open and elongated parallel horizontal die cells 28 of suitable and desired cross sectional configuration, herein indicated to be rectangular in nature, a first portion of the length of each die cell adjacent its entrance end being suitably mounted within and extending through an enclosed chamber 30 mounted for rotation with a horizontal drive shaft 32 suitably mounted for rotation in bearings 34. As the die cells 28 rotate in unison with the shaft 32, the entrance ends thereof will travel in an annular path for a purpose to appear hereinafter. A suitable source of heat, such as an electric gas heater, is indicated schematically at 36 as being suitably connected to conventional heating units 38 disposed about the external surface of the first portion of each die cell within the chamber 30, while a conventional control member, such as the thermostat indicated at 40, controls the temperature of the heating units in a known manner to control heating of the aforementioned first portions of the respective die cells.

The respective die cells include second portions of the lengths thereof extending between the aforementioned first portions and exit ends thereof, and projecting through an enlarged opening 42 formed in one axial end of a housing 44 which encloses such second portions of the die cells. A shield member 46 is suitably mounted with respect to the die cells for rotation with the latter, and substantially sealingly closes the opening 42 in the housing as the die cells rotate in unison as will appear hereinafter. The second portions of the respective die cells respectively include a plurality of axially spaced small apertures 48 in the side walls thereof. Means such as a fan indicated schematically at 50 as being disposed in the end of the housing 44 axially opposite from the exit ends of the die cells is suitably driven and adapted to blow air at ambient temperatures along the external surfaces of the second portions of the die cells for cooling the hay confined therein during the wafering process, such cooling air being vented through the vent 52 and a substantial portion thereof being prevented from leaking from the opposite end of the housing by means of the shield 46 aforedescribed.

The exit ends of the respective die cells are provided with one or more adjustable wall members indicated schematically at 54 and suitably connected as by hinges indicated at 56 at such exit ends to vary the convergent cross sectional areas of the die cells, the wall members being selectively adjustable for this purpose preferably, although not necessarily, by a remotely controlled mechanism not shown. While extrusions of compressed hay emerging from the exit ends of the die cells as will appear more fully hereinafter may normally break into wafers due to their own weight, it may be desirable to equip the exit end of each die cell with an ejection plate 58 which extends axially therebeyond and terminates in an oblique projection extending over the axis of the die cell so as to be engageable with the leading end of an emergent extrusion to bend the latter radially outwardly of the die cells to break the extrusion into wafers of a preselected length. Irrespective of the manner in which the wafers are broken from the extrusions, they are adapted to fall within the housing 44, into a discharge conduit 60 communicating with the latter and upon one end of a conventional elevator-type conveyor 62 disposed beneath the bottom of the housing, and which picks up the wafers and conveys them from the apparatus preferably into a trailing conveyance.

A relatively large fly wheel or drive pulley 64 is suitably rotatably mounted on the frame 12 and is connected in drive transmitting relation to the drive shaft 32 through a suitable indexing type drive mechanism indicated schematically at 66 so as to rotatably index the shaft 32 and, hence, the die cells 28 at predetermined intervals as will appear hereinafter. Furthermore, and as will be appreciated more fully hereinafter, conventional means indicated schematically at 68 in FIGURE 1 couples the rotary indexable drive mechanism 66 to a suitable drive mechanism 70 for the feed and compression mechanism 24 so that the latter will operate in timed or synchronized relation to indexing movement of the die cells.

A suitable engine 72 is mounted on the frame 12 and includes an output shaft including a pulley driving a belt 74 entrained about the fly wheel 64 to drive the latter and, through the rotary indexable drive mechanism 66, the shaft 32, while another belt 76 is entrained about the fly wheel 64 and a pulley connected to the rotary flail pick-up mechanism aforementioned to drive the latter.

The apparatus aforedescribed is adapted to be towed along a field of mown or cut hay, preferably with the hay arranged in windrows and having been preconditioned or processed in a known manner so as to consist of finely chopped, mixed and blended stem and leaf components forming a substantially homogenous mass. As the apparatus is towed along the field, the hay mixture in a given windrow is adapted to be picked up in the pick-up mechanism 18 which is operable to direct the homogenized hay into the delivery chute 22 of the pick-up mechanism which delivers the hay through a suitable opening in a side wall of the feed and compression mechanism 24 as illustrated particularly in FIGURE 2.

Figure 2:
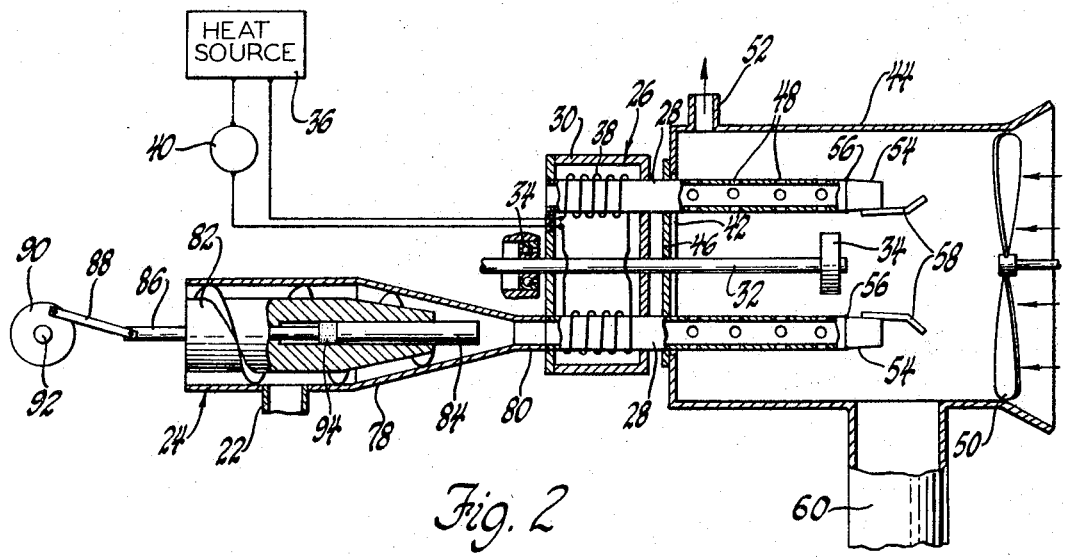
FIGURE 2 is an enlarged fragmentary sectional and somewhat schematic view taken generally along line 2—2 of FIGURE 1.

Referring now particularly to FIGURE 2, it may be seen that the feed and compression mechanism 24 comprises a housing 78 adapted to receive the hay from the delivery chute 22, and which housing tapers inwardly at one end thereof and terminates at an outlet or discharge throat 80 of substantially uniform cross section throughout its length, and corresponding to the cross sections of the die cells 28. It will also be noted that the outlet or throat 80 is disposed in a fixed location immediately opposite the annular path of indexable travel of the die cells for communication with successive ones of the entrance ends thereof or shaft 32 is rotatably indexed.

A rotatable feed auger 82 having a suitable number of auger flights is suitably rotatably mounted within the housing 78, while a piston member 84 is suitably mounted coaxially with the axis of rotation of the auger for reciprocation relative thereto and opposite throat 80 and, for this purpose, is connected through the rod 86 and link 88 to a crank arm 90 mounted on a drive shaft 92. As will be apparent, the drive shaft 92 and its associated drive elements form a part of the drive mechanism 70 aforedescribed which additionally includes suitable means for rotating the auger 82. A resilient shock absorber member 94 is interposed between the piston 84 and its drive rod 86 to absorb shock loadings as the piston compresses hay into the die cells.

Referring now to the operation of the structure aforedescribed, it may be assumed that the parts are in the position shown in FIGURE 2 in which hay is being supplied to the feed and compression mechanism 24 as aforedescribed and the die cell construction 26 has been indexed by its drive mechanism 66 so as to register the entrance end of one of the die cells 28 with the discharge throat 80 of the feed and compression mechanism. At this time, a dwell period occurs with respect to indexing of the die cell construction, and during which period hay is fed continuously by the feed auger 82 to the discharge throat 80 of the feed and compression mechanism 24. Simultaneously, the piston 84 is reciprocated a suitable and desired number of times to compress a given quantity of hay to be wafered into the associated die cell. After such quantity of hay is compressed into such die cell, the die cell construction 26 is again indexed while the drive mechanism 70 for the feed and compression mechanism 24 dwells to communicate the entrance end of another die cell with the discharge throat 80. At this time, the drive mechanism 66 again dwells while the drive mechanism 70 operates to compress a similar quantity of hay into the die cell. This process is repeated continuously with the die cell construction 26 being repeatedly rotatably indexed in the fashion of a revolver barrel to result ultimately in each of the die cells 28 confining an extrusion of compressed hay emerging from the exit end thereof upon successive compression strokes of the piston member 84 compressing still additional hay into the entrance ends of such die cells.

While the extrusions of hay are confined within and being compressed through the respective die cells, the heating units 38 apply heat at a predetermined heating temperature to the external walls of the die cells, which heat is conducted therethrough so as to heat the contiguous surface of the bundles or extrusions of hay contained within the respective die cell to cause such hay to plasticize at least partially and to be further compressed by the action of the piston 84 and the pressure applied by wall members 54 resisting the flow of the extrusions through the die cells. In this regard, the lengths of the first portions of the die cells within chamber 30 are such relative to the speed of operation and cycling time of the feed and compression mechanism 24 and die cell construction 26 to provide a desired hold time for the extrusions within heated chamber 30 as such extrusions are periodically moved toward the second portions of the die cells and the exit ends of the latter.

Hay extrusions heated, compressed and plasticized in the foregoing manner are therefore gradually forced into and through the second portions of the die cells within the housing 44 thereof. The fan 50 blows cooling air at ambient temperatures along the exterior surfaces of the die cells within the housing 44, the cooling effect of such air acting both directly on surface portions of the extrusions confined within the die cells through the apertures 48 and by conduction through the walls of the die cells to cool the contiguous surfaces of the extrusions confined therein. The temperature of the cooling air is considerably less than the heat previously applied and cools the surfaces of the extrusions to a temperature below that to which they were previously heated and, furthermore, a temperature at which the plasticized extrusions are caused to set so as to subsequently be completely stable and self-sustaining in the sense of resisting any tendency of expanding and breaking up once they emerge from the confines of the die cells. In this regard, it may be noted that the lengths of the second portions of the die cells which are cooled are such relative to the operating speed and cycling time of the apparatus to provide a desired hold time for the extrusions in the cooling housing 44. More specifically, the first portions of the die cells are preferably shorter than the second portions thereof as illustrated, whereby the hold time during heating is shorter than during cooling.

As aforementioned, the extrusions of compressed hay emerging from the die cells may, upon hanging over the exit ends thereof, break of their own weight and drop into the discharge chute 60 for delivery to the elevator. However, as illustrated, the ejection plates 58 aforedescribed are provided for engagement with the emergent ends of the extrusions which, upon engagement therewith, are bent laterally of the axes of the die cells and wafers broken therefrom substantially at the exit ends of the die cells for conveyance to the conveyor as aforedescribed.

Wafers formed by the method and apparatus aforedescribed have, relatively speaking, a dense thin bonded outer skin, shell or crust enclosing and confining a relatively less dense and thicker or more bulky body or core potrion thereof, the aforementioned skin or shell having a glaze-like appearance. The aforementioned skin or shell of the wafers and the resultant density of the latter make them quite stable and able to readily withstand the drop to the elevator 62, subsequent conveyance therealong and all other handling required in transporting them to a final storage site in bulk. Furthermore, since only the surfaces of the extrusions of hay are heated and then subsequently cooled, a small amount of energy, relatively speaking, is required to first heat and plasticize the hay and then cool and set the extrusion in its final shape or form as aforedescribed, thereby keeping to a minimum the horsepower required for the engine of the apparatus and resulting in obvious operating economics. In addition, again since only the surfaces of the extrusions are heated and then cooled, it will be readily apparent that heating and cooling times are kept to a minimum, thereby contributing to the speed of operation of the apparatus and method and the over-all output of wafers therefrom. In this regard, the completely formed wafers are cool and dry, relatively speaking, thereby avoiding any critical and subsequent drying time to insure that it is safe to store them in bulk without the danger of spoilage.

At this juncture, it may be noted that, by way of example, such things as the pressures applied to the extrusions of hay as they are compressed through the die cells, the heating and coating temperatures successively applied thereto, the time periods during which such temperatures are applied and the moisture content by weight of the starting crop to be wafered may be varied relative to each other in accordance with the characteristics desired to be imparted to finished acceptable wafers, including such considerations as providing a minimum number of fines and an optimum density not only from the standpoint of the wafers withstanding subsequent handling, which can be relatively severe, but also being readily edible and digestible by livestock at the same time, and providing wafers which are sufficiently dry to permit relatively prompt storage thereof without danger of spoilage. On the other hand, the method and apparatus aforedescribed have been found to provide particularly acceptable wafers applying the exemplary criteria aforementioned and others in wafering vairous common types of hay crops while employing starting crops having an initial moisture content by weight and utilizing pressures, temperatures, temperature hold times and the like as aforementioned particular ranges and values.

Thus, such acceptable hay wafers have relatively consistently resulted from wafering crops having a moisture content by weight in the range of approximately 5 to 25 percent, although some starting crops having moisture contents by weight of approximately 40 percent have also been successfully wafered. The compression pressures employed in making such acceptable wafers are subject to considerable variation in accordance with the other variables aforementioned employed in the process and the ultimate unit density desired in the wafers, and pressures in the range of approximately 720 p.s.i. to 2160 p.s.i. have been used successfully. In this regard, it is preferred that the ultimate unit density of the wafers fall in the range of approximately 20 to 40 lbs. per cubic foot, with approximately 30 lbs. per cubic foot being considered particularly ideal under a majority of circumstances. In obtaining acceptable wafers within such a density range, the first portions of the respective die cells and the surfaces of the extrusions confined therein have been heated to a temperature within a range of from approximately 300 to 400° F., and preferably to temperature of approximately 350° F., followed by applying a cooling medium, such as air, at approximately 100° F. to the second portions of the die cells to cool the surfaces of the extrusions confined therein to a temperature below approximately 130° F. As aforementioned, the first portions of the lengths of the respective die cells are shorter than the second portions thereof whereby the hold time of a given extrusion of hay confined within a respective die cell is shorter during the heating operation than the cooling operation. Acceptable wafers have been formed utilizing a hold time during the heating operation of approximately 10 seconds while that during cooling is approximately 20 seconds.

Prior to describing the embodiments shown in FIGURES 3 through 6, it should be noted in the first instance that they are directed to modifications in either the die cell heating or cooling components aforedescribed, and are respectively interchangeable with each other and with the corresponding components already described. Furthermore, since such heating and cooling components operate independently of each other in the sense of accomplishing the application of heat or a cooling medium and are in all cases suitably associated with each other so that a given extrusion of hay can pass between heated and cooled portions of the die cells as aforedescribed, the remaining embodiments will be described hereinafter with reference to simplified schematic illustrations thereof showing, in particular, but one die cell although it is to be understood that a plurality of die cells will be employed as previously described.

Referring then to the embodiment of FIGURE 3, it may be seen that the aforedescribed feed and compression mechanism 24 is adapted to deliver hay to be wafered into the entrance end of a die cell 28 and the first portion thereof enclosed within a heating chamber 96. In this embodiment, the die cell may be provided with a plurality of fins 98 or other effective heat transfer means for conducting heat from the chamber 96 through the wall of the die cell to the surface of the extrusion of hay being compressed therewithin. A fluid heat transfer medium is adapted to be continuously circulated through the chamber by means of the circuit 100 including a suitable pump 102 and heating unit 104 of an electric, gas or other suitable known variety. A conventional high temperature control mechanism indicated schematically at 106 may be connected in the circuit between the heating unit 102 and the chamber 96 to limit opeartion of the heating unit in accordance with some preselected or predetermined limit temperature, while another conventional temperature control indicated schematically at 108, such as a thermostat, senses the temperature of the fluid medium in the chamber 96 to turn the heating unit on or off as required to maintain the desired temperature within the chamber.

In the embodiment of a cooling unit illustrated in FIGURES 4 and 5, the die cell 28 extends into and through an enclosing housing 110 into which cooling air at a predetermined temperature is blown as by the fan 112, and from which the air is exhausted through the vent 114. In this embodiment, the major portion of the length of the die cell within the housing 110 comprises rectangularly spaced elongated parallel angle irons or bars 116 which will embrace the corners of the extrusion of hay being forced therethrough while exposing a substantial longitudinal surface portion of each side of the hay extrusion to the cooling air.

FIGURE 6 illustrates another embodiment of a cooling unit in which the housing 118 thereof encloses the portion of the die cell 28 extending therethrough. A liquid heat transfer medium substantially fills the housing 118 and is circulated therethrough through the conduit means 120 including a conventional heat changer 122 and pump 124. The fan 126 blows cooling air through the heat exchanger so as to deliver the liquid heat transfer medium through the pump to the housing at the cooling temperature desired.

It will be appreciated that each of the embodiments shown in FIGURES 3 through 6 and described above function in either heating or cooling, as the case may be, the hay being compressed through a given die cell as described above with respect to the embodiment of FIGURES 1 and 2 and, therefore it is deemed unnecessary to repeat such description.

The embodiments of the invention in which an exclusive property or privilege is claimed are defined as follows:

1. A method of wafering hay comprising heating the surface of a bundle of hay fibers above a temperature of 150° F. while simultaneously applying pressure thereto to at least partially plasticize and form the bundle of hay into a desired wafer shape, and maintaining the bundle of hay in the desired shape while cooling the surface thereof at least to said temperature to set the bundle of hay in the desired shape.

2. A method of wafering hay comprising heating the surface of a bundle of hay fibers above a temperature of 150° F. while simultaneously applying pressure thereto to at least partially plasticize and form the bundle of hay into a desired wafer shape, and maintaining the bundle of hay in the desired shape while cooling the surface thereof below said temperature to set the bundle of hay in the desired shape and so as to have a relatively dense thin bonded outer skin confining a relatively less dense thicker body portion thereof.

3. A method of wafering hay into compressed hay wafers comprising heating the surface of a bundle of hay fibers above a temperature of 150° F. while confined under pressure to compress the bundle of hay, and subsequently cooling the surface of the compressed bundle of hay below said temperature while confined under pressure to set the shape of the compressed bundle of hay and so as to have a relatively dense thin bonded outer skin confining a relatively less dense thicker body portion thereof, and breaking the compressed bundle of hay into wafers.

4. A method of wafering hay into hay wafers comprising feeding hay fibers into a radially confining die cell, applying pressure axially of the hay in the die cell while heating the surface of the hay above a temperature of 150° F. to form a compressed extrusion of hay confined within the die cell, and subsequently cooling the surface of the extrusion of the hay below said temperature while confined in the die cell to set the shape of the extrusion of hay and so as to have a relatively dense thin bonded outer skin confining a relatively less dense thicker body portion thereof, and breaking the extrusion of hay into wafers as it emerges from the die cell.

5. A method of wafering chopped and blended hay into hay wafers comprising continuously feeding hay fibers to the entrance end of an axially open die cell, successively applying force to hay at the entrance end of the die cell to compress the hay into and therethrough to form an extrusion of compressed hay emerging from the exit end thereof, successively heating and cooling the surface of the extrusion respectively above and below a temperature of 150° F. while force is being applied thereto to at least partially plasticize the extrusion and subsequently set the shape thereof within the die cell and so as to have a relatively dense thin bonded outer skin confining a relatively less dense thicker body portion thereof, and breaking the extrusion into wafers as it emerges from the exit end of the die cell.

6. A method of wafering chopped and blended hay into hay wafers comprising continuously feeding hay fibers to the entrance end of an axially open elongated die cell, successively applying pressure to the hay at the entrance end of the die cell to compress the hay into and therethrough to form an extrusion of compressed hay emerging from the exit end thereof, heating the surface of the extrusion above a heating temperature of 150° F. while pressure is being applied thereto to at least partially plasticize the hay, subsequently cooling the surface of the extrusion while pressure is being applied thereto to a cooling temperature below said heating temperature to set the shape of the extrusion within the die cell and so as to have a relatively dense thin bonded outer skin enclosing a relatively less dense thicker body portion thereof, and breaking the extrusion into wafers as it emerges from the exit end of the die cell.

7. The method according to claim 6 wherein the surface of the extrusion of hay is heated and cooled for different periods of time.

8. The method according to claim 6 wherein the surface of the extrusion of hay is cooled for a longer period of time than it is heated.

9. An apparatus for field wafering forage crops comprising a mobile frame adapted to be drawn through a field, a plurality of axially open die cells each having an entrance and an exit end, means mounting said die cells for rotary indexible movement in unison on said mobile frame, hay feeding and compression means for feeding and compressing chopped and blended hay to be wafered into the entrance ends of successive ones of said die cells upon rotary indexing of the latter, heating means for heating a first portion of the length of each die cell adjacent the entrance end thereof to heat the contiguous surface of the hay confined therein while pressure is being applied thereto to at least partially plasticize and compress the hay into an extrusion, cooling means for cooling a second portion of the length of each die cell between said first portion and exit end thereof to cool the contiguous surface of the extrusion of hay confined therein while pressure is being applied thereto to set the shape of the extrusion of hay within said second portion of each die cell so as to have a relatively dense thin bonded outer skin confining a relatively less dense thicker body portion thereof, and means adjacent the exit ends of said die cells engageable with the extrusions of hay emergent therefrom to break said extrusions into wafers.

10. An apparatus for field wafering forage crops comprising a mobile frame adapted to be drawn through a field, a plurality of axially open die cells each having an entrance and an exit end, means mounting said die cells for rotary indexible movement in unison on said mobile frame, hay feeding and compression means for feeding and compressing chopped and blended hay to be wafered into the entrance ends of successive ones of said die cells upon rotary indexing of the latter, heating means for heating a first portion of the length of each die cell adjacent the entrance end thereof to heat the contiguous surface of the hay confined therein above a predetermined heating temperature while pressure is being applied thereto to at least partially plasticize and compress the hay into an extrusion, cooling means for cooling a second portion of the length of each die cell between said first portion and exit end thereof to cool the contiguous surface of the extrusion of hay confined therein to a predetermined cooling temperature below said predetermined heating temperature while pressure is being applied thereto to set the shape of the extrustion of hay within said second portion of each die cell so as to have relatively dense thin bonded outer skin confining a relatively less dense thicker body portion thereof, and means adjacent the exit ends of said die cells engageable with the extrusions of hay emergent therefrom to break said extrusions into wafers.

11. A method of wafering hay comprising supplying hay to be wafered to hay compression means disposed opposite the annular path of rotation of the entrance ends of an annular series of die cells which are rotatably indexible in unison along such annular path, rotatably indexing step-by-step said entrance ends of successive ones of said die cells into communication with said hay compression means, compressing hay into and through successive die cells while communicating with said hay compression means to form extrusions of hay emerging from exit ends thereof, and successively heating said extrusions above a temperature of 150° F. and then cooling said extrusions at least to said temperature while confined within said die cells.

12. A method of wafering hay comprising supplying hay to be wafered to hay compression means disposed at a fixed location opposite the annular path of rotation of the entrance ends of an annular series of die cells which are rotatably indexible in unison along such annular path, rotatably indexing step-by-step said entrance ends of successive ones of said die cells in communication with said hay compression means, compressing hay into and through successive die cells while communicating with said hay compression means to form extrusions of hay emerging from exit ends thereof, and successively heating said extrusions above a temperature of 150° F. and then cooling said extrusions at least to said temperature while confined within said die cells.

13. A method of wafering hay comprising supplying hay to be wafered to reciprocable hay compression means disposed at a fixed location opposite the annular path of rotation of the entrance ends of an annular series of parallel die cells which are rotatably indexible in unison along such annular path, rotatably indexing step-by-step said entrance ends of successive ones of said die cells into communication with said hay compresion means in timed relation with reciprocation of the latter, compressing hay into and through successive die cells while communicating with said hay compression means to form extrusions of hay emerging from exit ends thereof, and successively heating said extrusions above a temperature of 150° F. and then cooling said extrusions at least to said temperature while confined within said die cells.

14. An apparatus for making compressed hay wafers comprising an annular series of die cells each having spaced entrance and exit ends, means mounting said die cells for rotary indexible step-by-step movement in unison whereby said entrance ends thereof travel in an annular path, hay compression means disposed opposite said annular path of travel of said entrance ends of said die cells for communication with successive ones of the latter as said die cells are rotatably indexed, means for rotatably indexing said die cells and successive ones of said entrance ends thereof into communication with said hay compression means, said hay compression means compressing hay into and through said die cells to form extrusions of hay emerging from the exit ends thereof, heating means for heating a first portion of the lengths of said respective die cells adjacent the entrance ends thereof to heat the contiguous surface of the extrusions of hay confined therein, and cooling means for cooling a second portion of the lengths of said respective die cells between said first portion and exit ends thereof to cool the contiguous surface of the extrusions of hay confined therein.

15. An apparatus for making compressed hay wafers comprising an annular series of die cells each having spaced entrance and exit ends, means mounting said die cells for rotary indexible step-by-step movement in unison whereby said entrance ends thereof travel in an annular path, hay compression means disposed opposite said annular path of travel of said entrance ends of said die cells for communication with successive ones of the latter as said die cells are rotatably indexed, means for rotatably indexing said die cells and successive ones of said entrance ends thereof into communication with said hay compression means in timed relation to operation of the latter, said hay compression means compressing hay into and through said die cells to form extrusions of hay emerging from the exit ends thereof, heating means for heating a first portion of the lengths of said respective die cells adjacent the entrance ends thereof to heat the contiguous surface of the extrusions of hay confined therein, and cooling means for cooling a second portion of the lengths of said respective die cells between said first portion and exit ends thereof to cool the contiguous surface of the extrusions of hay confined therein.

16. An apparatus for making compressed hay wafers comprising an annular series of relatively fixed parallel die cells each having spaced entrance and exit ends, means mounting said die cells for rotary indexible step-by-step movement in unison whereby said entrance ends thereof travel in an annular path, reciprocable hay compression means disposed in a fixed location opposite said annular path of travel of said entrance ends of said die cells for communication with successive ones of the latter as said die cells are rotatably indexed, means for reciprocating said hay compression means in timed relationship with rotary indexible movement of successive ones of said entrance ends of said die cells into communication therewith, said hay compression means compressing hay into and through said die cells to form extrusions of hay emerging from the exit ends thereof, heating means for heating a first portion of the lengths of said respective die cells adjacent the entrance ends thereof to heat the contiguous surface of the extrusions of hay confined therein, and cooling means for cooling a second portion of the lengths of said respective die cells between said first portion and exit ends thereof to cool the contiguous surface of the extrusions of hay confined therein.

17. An apparatus for making compressed hay wafers comprising an annular series of relatively fixed parallel die cells each having spaced entrance and exit ends, means mounting said die cells for rotary indexible step-by-step movement in unison about a fixed axis whereby said entrance ends thereof travel in an annular path, feed hopper means for receiving hay to be wafered and including an outlet disposed in a fixed location opposite said annular path of travel of said entrance ends of said die cells for communication with successive ones of the latter as said die cells are rotatably indexed, a compression plunger mounted for reciprocation within said feed hopper means opposite said outlet thereof, means for reciprocating said plunger in timed relationship with rotary indexible movement of successive ones of said entrance ends of said die cells into communication wtih said outlet of said feed hopper means, said plunger compressing hay into and through said die cells to form extrusions of hay emerging from the exit ends thereof, heating means for heating a first portion of the lengths of said respective die cells adjacent the entrance ends thereof to heat the contiguous surface of the extrusions of hay confined therein, and cooling means for cooling a second portion of the lengths of said respective die cells between said first portion and exit ends thereof to cool the contiguous surface of the extrusions of hay confined therein.

References Cited
UNITED STATES PATENTS

| | | | |
|---|---|---|---|
| 699,115 | 4/1902 | Reagan | 100—38 |
| 737,424 | 8/1903 | Laernoes et al. | 100—223 |
| 802,755 | 10/1905 | Hall | 100—38 |
| 1,403,294 | 1/1922 | Cowan. | |
| 1,490,162 | 4/1924 | Dow. | |
| 2,205,865 | 6/1940 | Schwarzkopf | 75—122 |
| 2,296,516 | 9/1942 | Goss | 18—5 |
| 2,736,064 | 2/1956 | Rubin | 18—12 X |
| 2,747,222 | 5/1956 | Koch et al. | 18—12 X |
| 2,833,633 | 5/1958 | Hecht | 44—13 |
| 2,892,396 | 6/1959 | Ferguson et al. | 100—35 |
| 2,942,976 | 6/1960 | Kosch | 99—8 |
| 2,995,445 | 8/1961 | Briggs et al. | 99—8 |
| 3,013,880 | 12/1961 | King | 99—8 |
| 3,044,877 | 7/1962 | Lent | 99—8 |
| 3,070,002 | 12/1962 | Mathews | 100—35 |
| 3,075,456 | 1/1963 | Uschmann | 100—138 |

OTHER REFERENCES
140,358, dated in Scientific Library 12-13-61, Soviet Union.

LOUIS O. MAASSEL, *Primary Examiner.*

WALTER A. SCHEEL, *Assistant Examiner.*